Feb. 17, 1970  D. A. DRAUDT  3,495,698
CONTAINER FOR THERMOMETER AND LIQUID DISINFECTANT THEREFOR
Filed Nov. 1, 1967  2 Sheets-Sheet 1

INVENTOR.
DONALD A. DRAUDT
BY *Bosworth, Sessions,*
*Herrstrom & Cain*
ATTORNEYS

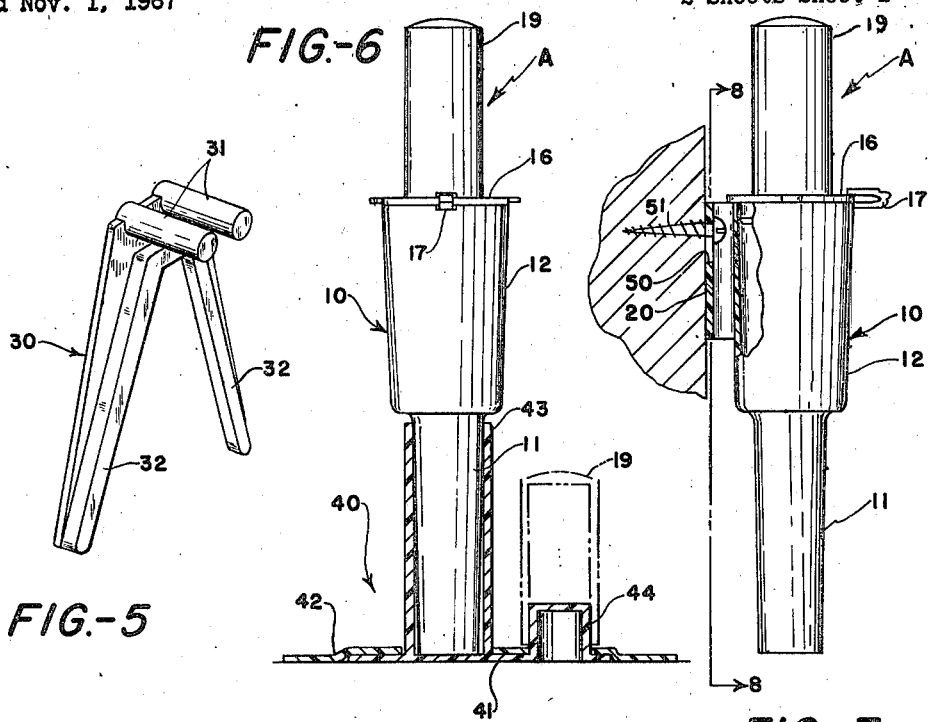
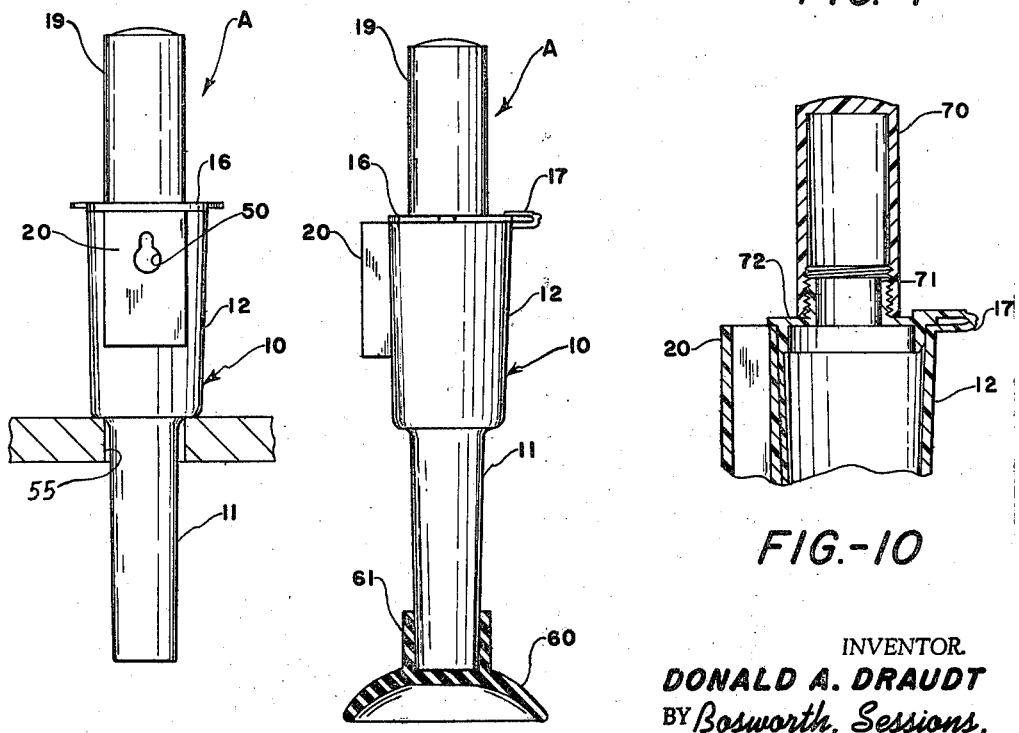

United States Patent Office 3,495,698
Patented Feb. 17, 1970

3,495,698
CONTAINER FOR THERMOMETER AND LIQUID DISINFECTANT THEREFOR
Donald A. Draudt, North Ridgeville, Ohio, assignor, by mesne assignments, to Jones-Zylon, Inc., West Lafayette, Ohio, a corporation of Ohio
Filed Nov. 1, 1967, Ser. No. 679,930
Int. Cl. B65d 81/22, 85/20, 85/30
U.S. Cl. 206—16.6     3 Claims

ABSTRACT OF THE DISCLOSURE

A container for a clinical thermometer and a liquid disinfectant in which one end of the thermometer may be immersed. The container body has an enlarged open end for introducing the liquid disinfectant and may be closed by an integral lid having a central socket for a removable cap that covers the top end of the thermometer extending out of the container body. The lid has a central opening within the socket, that receives and locates the thermometer, and various means are provided for supporting the container in an upright position to keep the lower end of the thermometer immersed in the liquid disinfectant.

BACKGROUND OF THE INVENTION

This invention relates to receptacles or containers for clinical thermometers and especially to containers that may be partially filled with a liquid disinfectant in which the thermometer may be immersed. More particularly the invention relates to such containers or receptacles in combination with special means for supporting the same in a number of various upright positions to keep the temperature sensing end of the thermometer immersed in the liquid disinfectant and to prevent spillage of the liquid from the container.

In medical clinics and hospitals it is common practice to provide each patient with a thermometer and a receptacle therefor such as a glass tube containing a disinfectant in which the lower end or temperature sensing end of the thermometer may be immersed. It is also common practice to attach these containers or receptacles to the patient's bed or to a nearby wall with adhesive tape or the like. This practice requires however that the receptacle be removed and sterilized after use by each patient.

Because of the inconvenience involved in changing these containers and in view of the shortage of hospital labor, the receptacles are not always replaced when they should be and it is possible that a thermometer for an incoming patient may be placed in the tube and disinfectant solution used for the thermometer of another patient. Thus, if improperly used, it is possible that the thermometer containers can be a means of spreading communicable disease.

Moreover, the fastening of a glass-tube-type receptacle to a wall, bedstand or other vertical surface near the patient's bed is an inconvenient and rather cumbersome method for holding the thermometer in an upright position so that it will remain immersed in the liquid disinfectant. Also, once the container is secured in place such as by adhesive tape or the like it is difficult to remove it to supply more liquid disinfectant when needed.

Furthermore in view of the high cost of hospital labor it is desirable to use disposable containers in order to avoid the necessity of sterilization for reuse. Accordingly the receptacle must be low in cost so that a new one may be supplied with each new thermometer as supplied to each incoming patient. Such receptacles as are available in the prior art however have been unable to fulfill these requirements due to high cost and the lack of effective means for securing the case in an upright position under the various circumstances which are encountered during the care of the patient.

The thermometer receptacle of the present invention however meets the requirements indicated above and affords other features and advantages heretofore not obtainable.

SUMMARY OF THE INVENTION

It is among the objects of the invention to support a clinical thermometer in an upright position while immersed in a liquid disinfectant with a number of supporting means adapted to a variety of situations encountered during hospitalization of a patient.

Another object is to provide a container for a clinical thermometer and for a liquid disinfectant in which the thermometer may be immersed, that may be easily resupplied with liquid disinfectant when necessary and which includes integral means cooperable with other structure for supporting the container in a substantially upright position at a convenient location near a patient's bedside.

Still another object is to provide a container which will afford the advantages indicated above and which is of low-cost construction so as to be disposable along with the thermometer after use during the hospital term of one patient.

These and other objects are accomplished by means of a thermometer container construction including an elongated container body having an open end adapted to receive the temperature sensing end of a clinical thermometer and also the liquid disinfectant in which the end of the thermometer is immersed. The open end of the container body receives a lid having a central socket formed on its outer side and a central opening located within the socket, the opening being adapted to receive and locate the clinical thermometer. An elongated cap fits over the outwardly extending end of the thermometer and is secured by the socket. The container body also has means associated therewith for removably mounting the container to a vertical surface. The container is preferably formed of a low-cost thermoplastic material by injection molding.

According to one aspect of the invention a dual-leg member is provided for use in connection with the integral mounting means and is adapted to be secured thereto to provide with the lower end of the container body, a tripod support for the container.

According to another aspect, the container is used in combination with a vertical mounting member comprising a flat base adapted to be adhered to a horizontal surface and an upwardly extending socket adapted to receive the lower end of the container body.

According to still another aspect, the container is used in combination with a mounting member for supporting the container vertically, the member comprising a suction cup and an upwardly extending socket adapted to receive the lower end of the container body.

According to a more limited aspect the mounting means associated with the container body includes an integral tubular bracket. In connection with this aspect, the container is used in combination with a wall mounting member comprising a flat base adapted to be adhered to a vertical wall and a hook extending upwardly in space from the base so as to receive the bracket.

BRIEF DESCRIPTION OF THE DRAWINGS

FIGURE 5 is a perspective view of the dual-leg member used to provide the tripod support as illustrated in FIGURE 3;

FIGURE 6 is an elevational view of the container body of FIGURE 1 supported on a horizontal surface by a special mounting device shown in section for the purpose of illustration;

FIGURE 7 is an elevational view showing an alternate means for attaching the container to a vertical wall, with parts broken way and shown in section for the purpose of illustration;

FIGURE 8 is an elevational view showing the container of FIGURE 1 supported in vertical position by extending the lower end of the container body through a circular opening typically used to locate intravenous feeding apparatus;

FIGURE 9 is an elevational view showing the container supported vertically by means of a suction-cup type support which is shown in section for the purpose of illustration; and FIGURE 10 is a fragmentary longitudinal sectional view showing an alternate means for connecting the cap at the top of the container to the hinged lid for the body of the container.

DESCRIPTION OF THE PREFERRED EMBODIMENTS

Referring more particularly to the drawings there is shown a container A for a clinical thermometer B wherein the thermometer is centrally positioned within the container and immersed in a liquid disinfectant C. The container A is formed of a thermoplastic material by injection molding and comprises a cylindrical body 10 having a lower end 11 of reduced diameter and an enlarged portion 12. The body 10 defines a reservoir 13 for the liquid disinfectant C in which the thermometer B is immersed.

Figure 2:
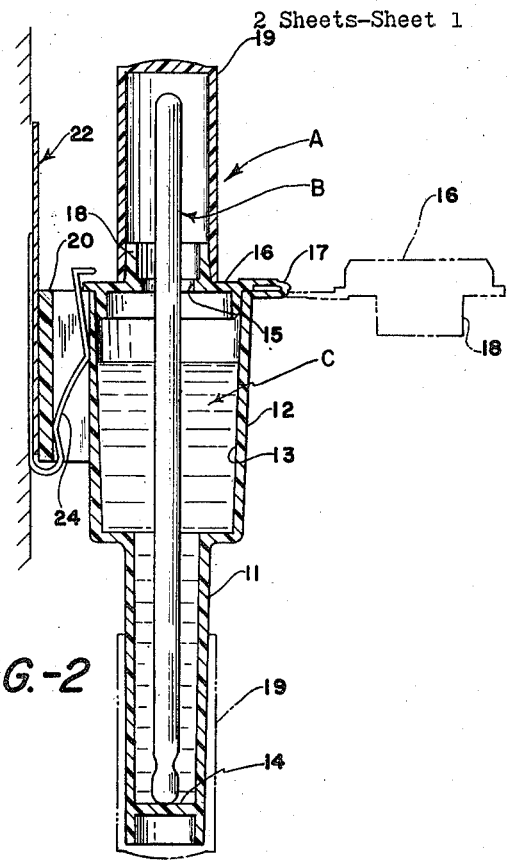
FIGURE 2 is a longitudinal sectional view of the container and mounting device of FIGURE 1 showing the cap removed from the top of the container and positioned over the lower end of the container body and also showing in dash lines the hinged lid of the container body in its open position.

Normally the thermometer B is positioned within the container A with its lower end or temperature sensing end resting against the floor 14 of the reservoir 13 as shown in FIGURE 2. The upper end of the thermometer B extends through an opening 15 in a hinged lid 16 that fits within the open end of the body 10. The lid 16 is connected to the body 10 by means of an integral hinge 17 which permits movement of the lid 16 between a closed position shown in solid lines in FIGURE 2 and an open position shown in dash lines shown in FIGURE 2. Opening the end of the container body permits the convenient resupply of the liquid disinfectant C to the reservoir 13 when necessary.

Concentric with the opening 15 in the lid 16 is an upwardly extending socket 18 in the form of a cylindrical wall, the socket 18 being adapted to receive snugly thereover, the lower end of a cap 19 which serves to cover the outwardly extending end of the thermometer B. The diameter of the socket 18 is approximately the same as the diameter of the lower end 11 of the body 10 so that the cap 19 may be positioned tightly over the lower end 11 as shown in dash lines in FIGURE 2 to provide a convenient storage position.

Formed on the central portion 12 of the body 10 is a U-shaped hanger bracket 20 that may be used in cooperation with other means to fasten the container A to a vertical wall at a convenient storage location.

Figure 1:
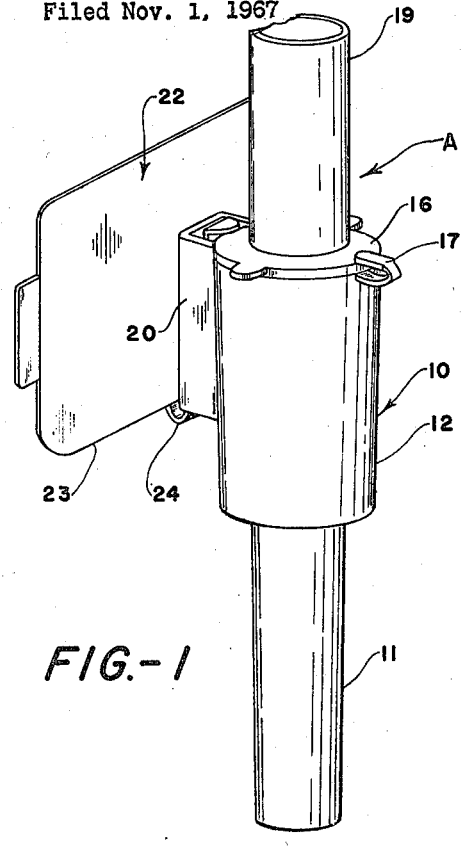
FIGURE 1 is a perspective view showing a container embodying the invention and illustrating the positioning of the container on a vertical wall by means of an adhesive backed mounting device.

FIGURES 1 and 2 show the container A fastened to a wall by means of a vertical fastening plate broadly indicated by the numeral 22, which comprises a flat base 23 formed of flexible sheet material having an adhesive applied to one side thereof for the purpose of securing the plate 22 to a vertical wall. Secured to the rearward side of the flat base 23 is a metal strip formed into the shape of a hook 24 which is adapted to support the container A in cooperation with the bracket 20 as shown in FIGURES 1 and 2.

Figure 3:
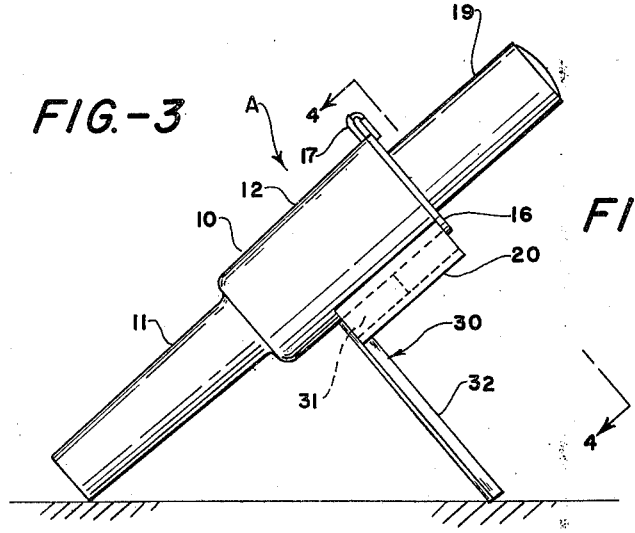
FIGURE 3 is an elevational view showing the container of FIGURE 1 used in connection with a special dual-leg member which together with the lower end of the container body serves to provide a tripod support.
Figure 4:
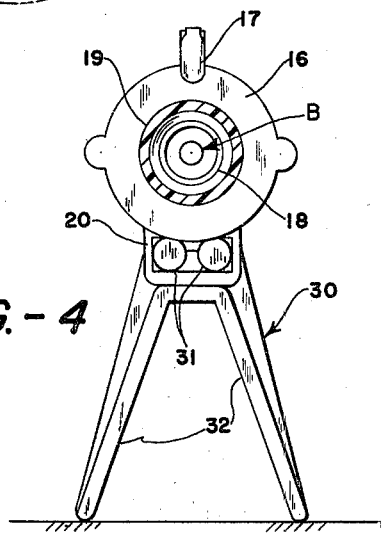
FIGURE 4 is a transverse sectional view taken on the line 4—4 of FIGURE 3.

FIGURES 3, 4 and 5 show an alternate means for supporting the container A in a manner which prevents spillage of the liquid disinfectant C and keeps the clinical thermometer B immersed therein. According to this embodiment the bracket 20 is used in cooperation with a dual-leg member 30 (FIGURE 5) which has two outwardly extending pins 31 adapted to be snugly inserted in the bracket 20 (FIGURES 3 and 4). In this position the legs 32 of the dual-leg member 30 provide with the lower end 11 of the body 10 a tripod support for the container A.

FIGURE 6 shows another form of the invention wherein the container A is supported in an upright position on a horizontal surface. According to this aspect the support is provided by means of a mounting base 40 comprising a flat metal base plate 41 having a skirt 42 of flexible adhesive backed sheet material secured thereto and adapted to have its outer marginal portion adhered to a horizontal surface. The base plate 41 has a vertical socket 43 adapted to receive the lower end 11 of the body 10 and another smaller socket 44 adapted to receive the cap 19 when it is removed as shown in dash lines.

FIGURE 7 shows still another means for securing the container A to a vertical wall wherein the bracket 20 is provided with an opening 50 in the shape of an inverted key hole (FIGURE 8) which may be used to connect the bracket to the head of a wood screw 51 or other fastening means on which the bracket may be hung.

FIGURE 8 shows the container A supported in an upright position on a horizontal surface by extending the lower end 11 thereof through a circular opening 55 of smaller diameter than the central portion 12, such as the openings commonly provided in various types of hospital equipment and furnishings for intravenous feeding apparatus.

FIGURE 9 shows still another means for supporting the container A in an upright position on a horizontal surface wherein a suction cup 60 having an upwardly extending socket 61 is provided for placement in any convenient location on a horizontal surface.

FIGURE 10 shows an alternate type of cap 70 for the outwardly extending end of the thermometer B wherein the lower end of the cap 70 is provided with internal threads and the socket 71 formed on the lid 72 is provided with external threads. This provides a somewhat more secure connection for positioning the cap 70 on the container.

With the container A being adapted for use in connection with the various supporting devices shown, the thermometer B may be conveniently stored while immersed in liquid disinfectant in almost any type of situation which may be encountered in a hospital facility or clinic. Thus even though a patient must be moved from one location to another for the purpose of receiving different types of specialized care he can still utilize the same thermometer and container for the duration of his hospitalization. Due to the low cost of the molded plastic container it can be disposed of after use by one patient, to avoid sterilization for reuse and considerable savings can be achieved over a period of time.

Normally each patient entering the hospital would be provided with his own clinical thermometer wrapped in a suitable protective package and inserted in the container A. The patient would carry the thermometer with him to his room where the container A would be filled with liquid disinfectant and positioned at the most convenient location available under the particular room conditions. As indicated above any of the described fastening means may be employed. When the liquid disinfectant is depleted due to evaporation or spillage a new supply may be introduced merely by opening the lid 16 and pouring liquid into the enlarged central portion 12. The lid 16 is then closed and the thermometer B extended through the opening 15 and thus immersed in the liquid C. While the cap 19 is normally positioned over the end of the thermometer when it is first supplied it normally would not need to be kept on the socket 18 and could be stored elsewhere such as over the lower end 11 of the container.

Although only one embodiment of the invention is illustrated and described it will be understood that variations and modifications may be made in the form and arrangement of the several parts and elements thereof without departing from the spirit of the invention. The invention therefore is not to be limited to the particular structures and mechanisms herein shown and described nor in any manner inconsistent with the extent to which the progress in the art has been advanced by the invention.

I claim:

1. A receptacle for a clinical thermometer and sanitizing liquid therefor comprising an elongated receptacle body having an open top end and a reservoir adapted to receive a lower length span of a clinical thermometer and sanitizing liquid in which said span is immersed, a lid hinged integrally to said body for pivotal movement between a closed position in said open top end and an open position permitting pouring of liquid into said reservoir through said open top end, said lid having a central socket and a central opening within said socket adapted to receive and locate said clinical thermometer with said lower length span in said reservoir and the upper end of said thermometer extending substantially above said lid, a separable cap adapted to be connected to said socket when said lid is closed to enclose said upper end of said clinical thermometer when so connected and being removable from said lid to perimt gripping of said upper end and a tubular bracket integral with said receptacle body for removably mounting said receptacle to a vertical surface.

2. A receptacle as defined in claim 1 in combination with a dual-leg member adapted to be secured to said mounting means fastened to said container body by fitting a portion thereof into said tubular bracket to provide with the lower end of said body a tripod support for said container.

3. A receptacle as defined in claim 1 wherein said elongated body has a lower end length of cylindrical form and of reduced lateral cross section whereby said end length may be inserted through an opening of corresponding diameter in a horizontal surface to support said receptacle in an upright position.

References Cited

UNITED STATES PATENTS

| | | | |
|---|---|---|---|
| 3,317,274 | 5/1967 | McCormick | 220—385 X |
| 1,562,348 | 11/1925 | Lockery | 21—88 X |
| 1,080,131 | 12/1913 | Weed | 248—163 |
| 2,910,995 | 11/1959 | Jacuzzi | 248—206 X |
| 2,765,998 | 10/1956 | Engert | 248—205 X |

JOSEPH R. LECLAIR, Primary Examiner

J. M. CASKIE, Assistant Examiner